Figure 1:
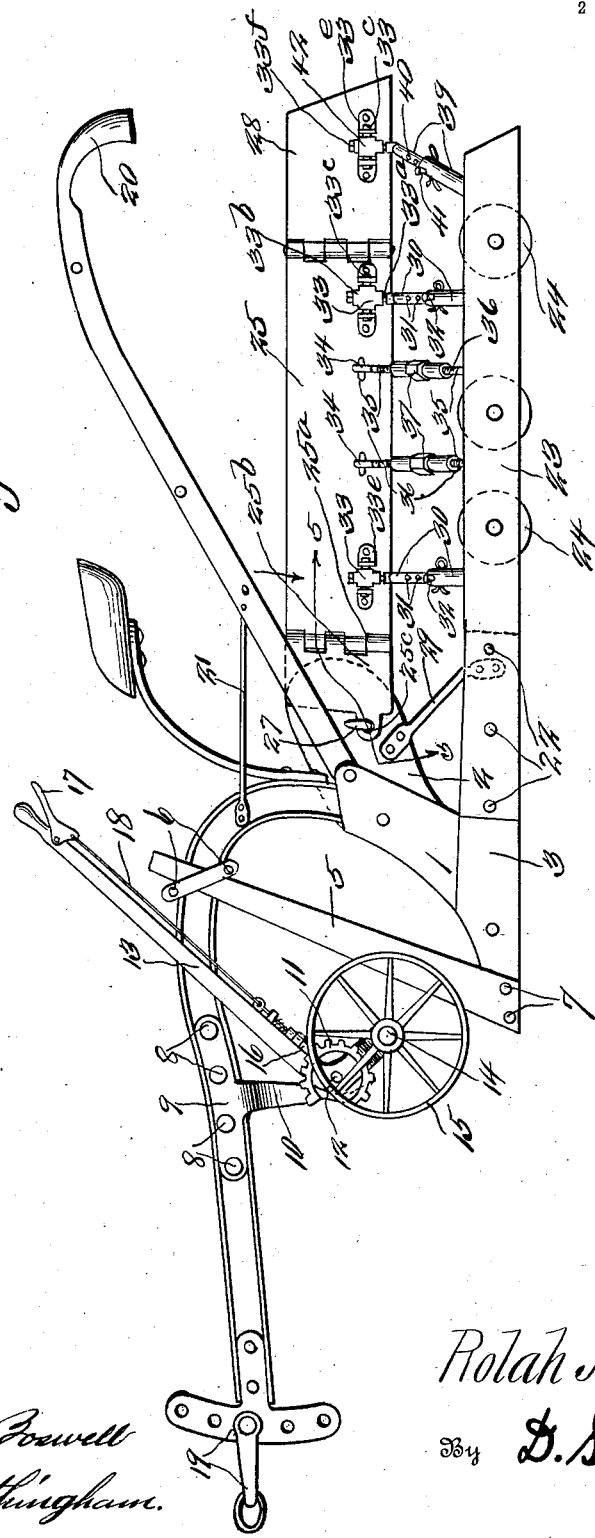

R. A. BAKER.
GRADING MACHINE.
APPLICATION FILED OCT. 23, 1911.

1,026,018.

Patented May 14, 1912.
2 SHEETS—SHEET 1.

Witnesses
Francis T. Boswell
C. E. Frothingham.

Inventor
Rolah A. Baker,
By D. Swift & Co.
Attorney

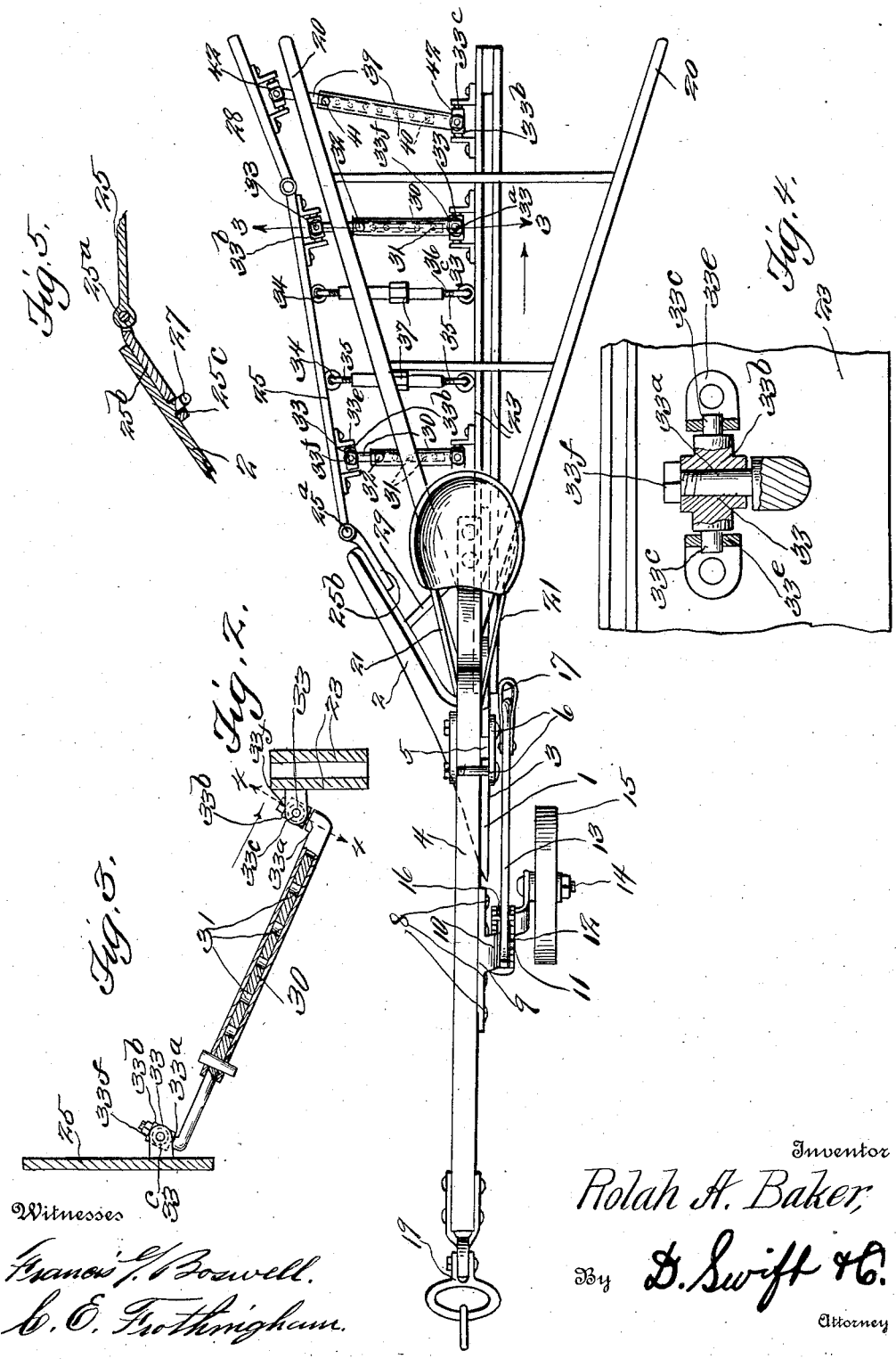

UNITED STATES PATENT OFFICE.

ROLAH ALPHERD BAKER, OF RICE, LOUISIANA.

GRADING-MACHINE.

1,026,018.      Specification of Letters Patent.      Patented May 14, 1912.

Application filed October 23, 1911. Serial No. 656,122.

*To all whom it may concern:*

Be it known that I, ROLAH A. BAKER, a citizen of the United States, residing at Rice, in the parish of Calcasieu and State of Louisiana, have invented a new and useful Grading-Machine; and I do hereby declare the following to be a full, clear, and exact description of the invention, such as will enable others skilled in the art to which it appertains to make and use the same.

This invention relates to a new and useful combined "levee" and "road" grader attachment, adapted for use in connection with plows for constructing "levees" in rice fields or the like, whereby the field may be properly irrigated.

The old or general method for constructing "levees" is to use what is known as a disk plow to start the "levees," and, subsequently, utilize what is termed a "pusher" for grading them. In this old or general method, from eight or more head of mules are used to pull the disk plow, and the same to pull a "pusher" or grader.

The present invention aims to provide a novel combined means for constructing and grading the "levees" at the same time, which means may be drawn by seven or eight head of mules, or possibly less, which will save time, as well as labor, in going over the field twice.

One of the objects of the invention is to provide a grading wing adapted to be connected to the moldboard of the plow, and so adjusted as to grade or top off the "levees." The connection between the grading wing is to be such, as to permit the wing to be adjusted vertically or horizontally.

A further object of the invention is to provide an extension on the land side of the plow, with means connecting between it and the grading wing for holding the grading wing adjustable horizontally with regard to the extension.

A feature of the invention is the provision of an extension wing hinged to the end of the grading wing.

A further feature of the invention is means connecting between the extension wing and the free end of the extension of the land side of the plow, for holding the extension wing adjusted at various angles with relation to the grading wing.

A further feature of the invention is the provision of a gage wheel carried by the beam of the apparatus and having means whereby the same may be adjusted, to regulate the depth of the plow, to uniformly construct the "levees."

The drawings only disclose one form of the invention, but in practical fields this form may necessitate alterations, to which the patentee is entitled, provided the alterations are comprehended within the scope of what is claimed.

The invention comprises further features and combinations of parts, as hereinafter set forth, shown in the drawings, and claimed.

In the drawings, Figure 1 is a view in side elevation showing the grading machine constructed in accordance with the invention. Fig. 2 is a plan view. Fig. 3 is a transverse sectional view on line 3—3 of Fig. 2. Fig. 4 is a detail view of one of the connections between the means connecting the extension of the land side of the apparatus and the grading wing. Fig. 5 is a detail view of the connection between the moldboard and the grading wing.

Referring to the drawings, 1 designates the usual form of plow, having a moldboard 2 and a land side portion 3. The plow 1 is provided with the usual beam 4, to which is clamped a cutter blade 5, as shown at 6. The lower end of the cutter blade is secured to the forward end of the plow, as shown at 7. Secured by clamps 8 to the beam is a plate 9, which is provided with a downwardly extending extension 10, the lower portion of which is provided with a racked quadrant 11. Pivoted to the extension, as at 12, is a lever 13. Journaled in bearings of the lower end of the lever is the stub shaft 14 of the gage wheel 15. The upper end of the lever is provided with a dog 16, designed to engage the teeth of the quadrant, for holding the lever and the gage wheel in adjusted position. The upper end of the lever is provided with a hand grip 17 having a rod connection with the dog, as shown at 18, whereby the dog may be actuated to release the lever, so that the same and the gage wheel may be adjusted.

The forward end of the beam 4 is provided with the usual connections 19 whereby an evener or equalizer may be connected, for drawing the apparatus through the field.

The plow is provided with the usual handles 20 having braces 21 between them and the beam.

Bolted, or otherwise connected, as shown at 22, is an extension 23 to the land side of the plow. This extension 23 may or may not be provided with disks 24. The disks 24, however, are only utilized when grading a road. In grading a road, the disks bury into the road, for holding the apparatus straight to its work, so that the grading wing 25 will throw the dirt entirely to one side of the apparatus. The grading wing 25 is hinged as at 25ª to the part 25ᵇ, which is provided with an aperture 25ᶜ to receive the hook 27 of the moldboard 26 of the plow. By this construction the grading wing may be adjusted, vertically and horizontally. Hinged to the free end of the grading wing is an extension wing 28, which may be thrown at various angles, when grading or topping off the "levees". It is to be understood that by connecting the grading wing to the moldboard in the manner shown, the grading wing will be so arranged as to strike the upper portions of the "levees", whereby they may be properly graded or topped off.

A brace member 29 connects between the moldboard and the land side of the plow.

A plurality of telescoping rods 30 are provided. These rods, at the points where they telescope, are provided with a plurality of apertures 31 which receive the pins 32, that is, when the apertures are in registration, for holding the rods in adjusted position. One end of each of the telescoping rods has universal connections 33 with the grading wing and the extension 23, so as to permit the telescoping rods to be moved as the grading wing is adjusted. The universal connections 33 comprise the pins 33ª at the end of the telescoping rods 30, which pins penetrate the sleeve 33ᵇ having lugs 33ᶜ, which are journaled in brackets 33ᵉ. Nuts 33ᶠ are threaded to the upper ends of the pins 33ª, as shown clearly in Fig. 4.

Connecting between the grading wing and the extension 23 by universal connections 34 are rods 35. The rods 35 consist of two parts, the adjacent ends of which are provided with right and left threads 36, with which the turnbuckles 37 coöperate, so as to hold the grading wing properly in position with relation to the extension 23. By adjusting the turnbuckles, the grading wing may be adjusted toward or from the extension 23.

A pair of telescoping rods 39, similar to the rods 30 and having apertures and pins 40 and 41 for holding them in adjusted position, are connected between the extension wing and the free end of the extension 23. The rods 39 have flexible connections 42 with the extension wing and the wing 23.

From the foregoing, it will be noted that a new and useful, simple and effective grading machine has been devised, for grading or topping of "levees", or grading a roadbed, and one which has been found to be practicable.

The invention having been set forth, what is claimed as new and useful is:—

In combination with a plow, a grading wing adjustably connected to the moldboard of the plow, an extension connected to the land side of the plow, telescopical rod connections between the extension and the grading wing, rods having turnbuckle connections between the wing and the extension whereby the wing may be brought toward or from the extension, means carried by the telescoping rod for holding the wing when adjusted, an extension wing hinged to the grading wing, means for holding the extension wing adjusted at various angles relative to the grading wing, the telescoping rods having universal connections with the grading wing and the first extension, means for holding the grading wing in adjusted position vertically, and an adjustable gage wheel and cutter for the plow.

In testimony whereof I have signed my name to this specification in the presence of two subscribing witnesses.

ROLAH ALPHERD BAKER.

Witnesses:
R. M. LAWSON,
C. A. LA RUE.